(12) United States Patent
Terres et al.

(10) Patent No.: US 7,597,735 B2
(45) Date of Patent: Oct. 6, 2009

(54) APPARATUS AND SYSTEM FOR UNIFORM SEALING FORCE IN AN AIR FILTER ASSEMBLY

(75) Inventors: Mark Terres, Stoughton, WI (US); Scott Schwartz, Fort Atkinson, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 341 days.

(21) Appl. No.: 11/614,849

(22) Filed: Dec. 21, 2006

(65) Prior Publication Data

US 2008/0148695 A1 Jun. 26, 2008

(51) Int. Cl.
*B01D 46/00* (2006.01)

(52) U.S. Cl. .............. 55/495; 55/502; 55/503

(58) Field of Classification Search .......... 55/481, 55/506, 502, 503, 504, 495, 385.3; D23/364; 123/198 E
See application file for complete search history.

(56) References Cited

U.S. PATENT DOCUMENTS

| | | | | |
|---|---|---|---|---|
| 3,993,464 A * | 11/1976 | Pelabon | ........................ | 55/480 |
| 4,758,256 A | 7/1988 | Machado | | |
| 5,030,264 A * | 7/1991 | Klotz et al. | .................... | 55/481 |
| 5,125,941 A * | 6/1992 | Ernst et al. | ..................... | 55/480 |
| 5,605,554 A | 2/1997 | Kennedy | | |
| 5,740,774 A * | 4/1998 | Kennedy | ................. | 123/198 E |
| 6,585,792 B2 * | 7/2003 | Schneider et al. | ............. | 55/481 |
| 6,604,604 B1 | 8/2003 | Badeau et al. | .............. | 181/258 |
| 6,712,869 B2 | 3/2004 | Cheng et al. | .................. | 55/418 |
| 6,749,657 B2 * | 6/2004 | Felber et al. | .................. | 55/497 |
| 6,776,814 B2 | 8/2004 | Badeau et al. | ............. | 55/385.3 |
| 6,780,217 B1 * | 8/2004 | Palmer | ....................... | 55/502 |
| 6,808,547 B2 * | 10/2004 | Ota et al. | ...................... | 55/478 |
| 7,004,986 B2 | 2/2006 | Kopec et al. | | |
| 7,112,232 B2 * | 9/2006 | Chang et al. | .................. | 55/481 |
| 2003/0121242 A1 | 7/2003 | Rieger et al. | | |
| 2004/0003580 A1 | 1/2004 | Avery | | |

* cited by examiner

*Primary Examiner*—Duane Smith
*Assistant Examiner*—Sonji Turner
(74) *Attorney, Agent, or Firm*—Andrus, Sceales, Starke & Sawall, LLP; J. Bruce Schelkopf (57) ABSTRACT

A uniform sealing force in an air filter assembly apparatus includes a housing having a channel with a plurality of incline portions and a plurality of land portions. The apparatus also includes an opening configured to receive a filter element assembly having a gasket flange, and a lid configured to cover the opening. The lid is coupled with at least one bayonet extending outward from the lid. The bayonet includes a plurality of incline portions and a plurality of land portions, the incline and land portions of the bayonet are configured to interface with the incline and land portions of the channel and provide a uniform axial sealing force on the gasket flange.

25 Claims, 8 Drawing Sheets

APPARATUS AND SYSTEM FOR UNIFORM SEALING FORCE IN AN AIR FILTER ASSEMBLY

BACKGROUND OF THE INVENTION

1. Field of the Invention

This invention relates to internal combustion engines, and more particularly to air intake cleaning systems.

2. Description of the Related Art

Many devices require the use of air for normal operation. Devices such as internal combustion engines, gas compressors, and ventilation systems all draw ambient air during normal use. However, the air intake systems of those devices are highly susceptible to particle contamination. In some cases, particle contamination may negatively affect system performance or even cause damage to the device. Air quality is especially critical with the internal combustion engine. In order to ensure air quality, air filters are generally used in association with the air intake system of the engine.

Air filters remove particles or contaminants from the air. Contaminants can include dust, pollen, mold, and bacteria. In many cases the internal combustion engine is powering a vehicle that is operating in a harmful environment to the engine. Besides the common consumer vehicle, air filters are used in off-road machinery, tractors, excavators, bulldozers, diesel semi trucks, backhoe loaders, etc. Air filters, or air cleaners, are generally positioned such that the air filter removes airborne particles before the air is drawn into the combustion chamber.

Air filters typically are placed in a housing which is connected with a throttle body of the engine. The air filters may be conical, rectangular, circular, or cubical in shape. Air filters should be inspected at regular intervals to ensure the air filter has not become clogged. The air filter is often replaceable, and may be changed along with the oil of the engine according to a predetermined maintenance schedule.

One type of air cleaner system that is common among industrial vehicles is the side load style air cleaner. In order to ensure that the side load air filter is properly situated within the housing, many methods attempt to apply a proper axial force to the air cleaner or filter. One such method is a basic "bayonet" type wedge that is inserted into a slot in the housing.

Current bayonet/wedge arrangements typically consist of a long straight member with a tapered leading edge. This design has at least three shortcomings. First, the bayonet initially applies force only at the first point of engagement of the slot. The remaining sealing area is unloaded. The air filter, or filter element, tends to tip on the uncompressed gasket and becomes skewed in the housing.

Second, continuous force is required to move the bayonet to full engagement. This may prove awkward or even difficult for some people. Third, as the bayonet moves into the slot in the housing, the contacting surfaces of the bayonet are non-uniformly loaded resulting in varying stress levels across the sealing flange. Improper removal and reinstallation of the air filter within the housing can cause significant problems such as the passage of water and other contaminants through the non-uniformly sealed flange. Therefore what is needed is a more easily inserted filter element that can apply a uniform load for axially sealing the filter element in a side load style air cleaner.

SUMMARY OF THE INVENTION

The present invention has been developed in response to the present state of the art, and in particular, in response to the problems and needs in the art that have not yet been fully solved by currently available air filter systems. Accordingly, the present invention has been developed to provide an apparatus, and system that overcome some or all shortcomings in the art.

In one aspect of the invention, an apparatus includes a housing comprising a channel having a plurality of incline portions and a plurality of land portions. The housing may comprise an opening configured to receive a filter element assembly having a gasket flange. The apparatus also includes a lid configured to cover the opening. The lid may be coupled with at least one bayonet extending outward from the lid. The bayonet comprises a plurality of incline portions and a plurality of land portions, the incline and land portions of the bayonet configured to interface with the incline and land portions of the channel and provide a uniform axial sealing force on the gasket flange.

In one embodiment, a magnitude of the uniform axial sealing force is selected to properly seal the filter element assembly to the housing. A plurality of factors may be used in determining a proper lid installation force. These factors include, but are not limited to, the axial sealing force required, an angle of the incline portion, a length of the land portion, a transition radius, and a length of the incline portion. In a further embodiment, the incline portions have an incline angle in the range of between about 2 and 15 degrees. Alternatively, the incline portions have an incline angle of about 10 degrees.

In a further embodiment, the housing further comprises an air intake port, and an air outlet port. The bayonet may include a spring detent configured to lock with the channel and prevent walk out of the filter element assembly. Alternatively, the bayonet may include a reverse incline portion configured to prevent walk out of the filter element assembly. The gasket flange is configured to reduce restriction as air passes through the filter element assembly.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
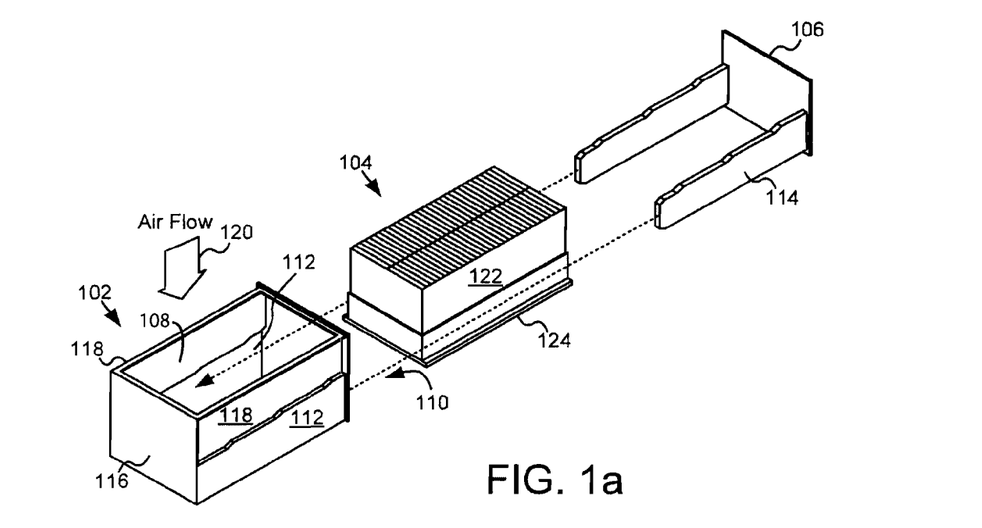
FIG. 1a is a perspective view diagram illustrating one embodiment of a system for uniform sealing force in an air filter assembly.

FIG. 1a is a perspective view diagram illustrating one embodiment of a system 100 for uniform sealing force in an air filter assembly. In one embodiment, the system 100 comprises a housing 102, a filter element assembly 104, and a lid 106. The housing 102 may comprise a plurality of openings, one opening 108 for the inlet of air, one opening (not shown) for the outlet of air, and one opening 110 configured to receive the filter element assembly 104.

The housing 102 may also comprise a plurality of channels 112 or slots extending from the opening 110 towards the rear 116 of the housing. Each channel 112 may be configured to receive a bayonet 114. The channels 112 may be integrally formed in the walls of the housing 102, or alternatively, the channels 112 may be formed separately and attached to the housing 102. The housing 102, in one example, may be formed of substantially one material such as a plastic material or a metal based material. Alternative materials which may be utilized in forming the housing 102 may include aluminum, polyethylene, polypropylene, polycarbonate, fiberglass, and other composite materials.

The housing 102, in one embodiment, may be defined by the opening 110, the rear wall 116, and side walls 118. As described above, the channels 112 may be integrally formed in the side walls 118. As depicted, the flow of air (represented by arrow 120) enters through the opening 108, passes through the filter element assembly 104, and exits through the outlet opening (not shown), which in the depicted embodiment, is located in the bottom surface of the housing 102.

The filter element assembly 104 is configured with filtration media 122 and a gasket flange 124. The filtration media 122 is configured to remove contaminants from the air flow passing through the housing 102. The specific type of contaminants removed from the air depends upon the type of filtration media 122 used. Any type of filtration media 122 may be utilized in combination with the present invention including, but not limited to, fibrous mat or web, including paper or glass, and woven or non-woven polymers.

The filtration media 122, in one embodiment, is coupled with the gasket flange 124. The gasket flange 124 is configured to seal the interface between the filter element assembly 104 and the housing 102 so that the flow of air must pass through the filtration media 122. As such, contaminants or particulates do not bypass the filtration media 122.

In the depicted embodiment, each bayonet 114 comprises a plurality of stepped load points that include an incline portion 126 and a land portion 128. Corresponding but inverse load points may be found in each channel 112. The load points of both the bayonet 114 and the channel 112 will be described in greater detail below. The bayonets may be coupled with the lid 106 or alternatively integrally formed with the cove 106. The lid 106 is configured to cover the opening 110 and prevent filter element assembly 104 movement. Alternatively, both the bayonets 114 and the lid 106 together with the filter element assembly 104 may form a unitary structure.

Figure 1B:
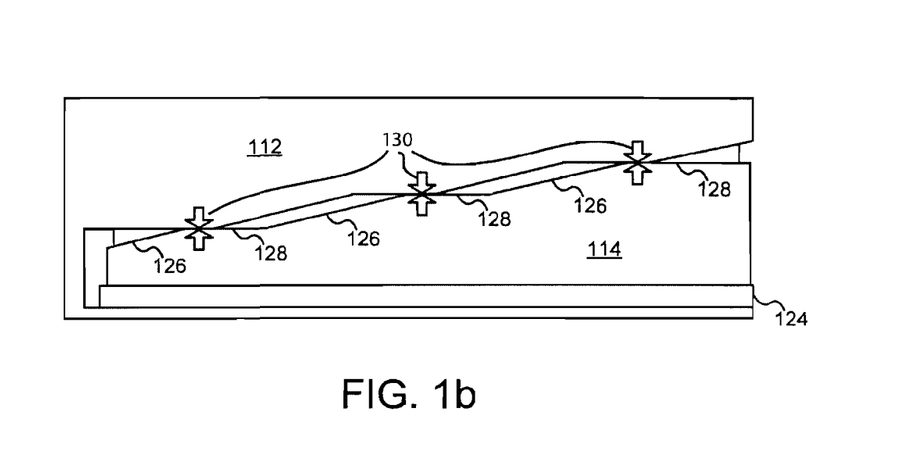
FIG. 1b is a schematic block diagram illustrating one embodiment of a cross section view of the bayonet and the channel.

FIG. 1b is a schematic block diagram illustrating one embodiment of a cross section view of the bayonet 114 and the channel 112. As described above, the bayonet 114 may include a plurality of stepped load points. In one embodiment, stepped load points refer to both an incline portion 126 and a land portion 128. As used herein, the term "land portion" refers to a portion of the bayonet that contacts the channel 112 when the bayonet 114 is in a fully engaged position. In the depicted embodiment, the land portions 128 comprise a substantially planar surface that is parallel to the gasket flange 124. However, as will become more apparent, the land portions 128 may comprise alternative configurations including arcs, reverse inclines, etc.

Arrows 130 represent contact points between the channel 112 and the bayonet 114. In a fully engaged or inserted position, the channel 112 provides a downward or axial force to the bayonet 114 which in turn transfers the force to the gasket flange 124 for sealing the filter element assembly 104 to the housing 102. One benefit of a stepped bayonet 114 design of the present invention is the elimination of an insertion force through almost the entire required travel of the bayonet 114. Only at the end of the travel are the stepped load points engaged. Further, the load points are engaged simultaneously resulting in even loading of the sealing gasket flange 124.

Figure 2:
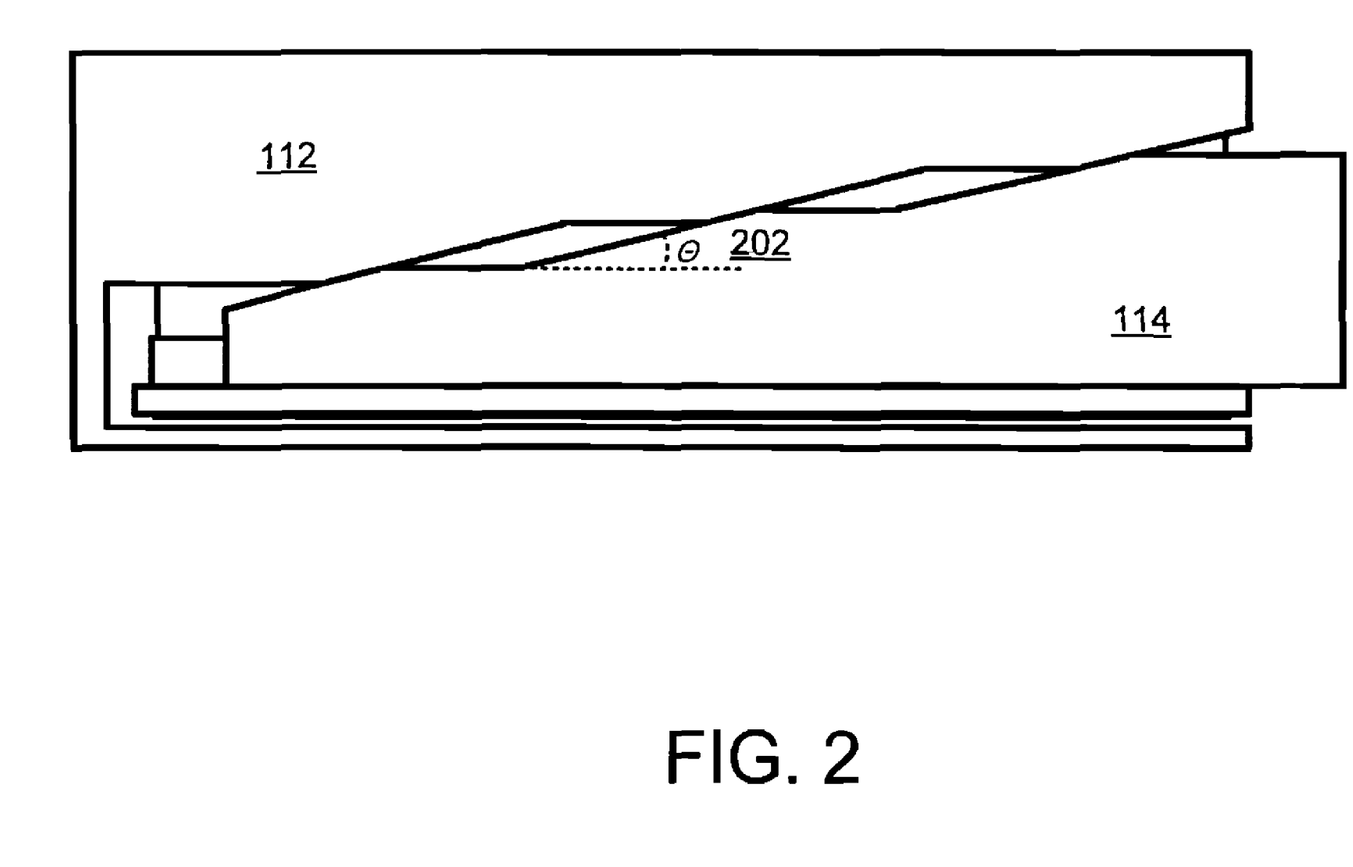
FIG. 2 is a schematic block diagram illustrating one embodiment of the bayonet at the point of first contact with the inclined surfaces of the channel in accordance with the present invention.

FIG. 2 is a schematic block diagram illustrating one embodiment of the bayonet 114 at the point of first contact with the inclined surfaces of the channel 112 in accordance with the present invention. The bayonet 114 may employ one or more discrete and stepped load points distributed across the length of engagement. In a further embodiment, the bayonet 114 may utilize three or more stepped load points, each load point comprising one incline portion 126 and one land portion 128 as depicted.

The stepped load points may be located on an upper edge of the bayonet 114, or on both edges of the bayonet in both symmetric and non-symmetrical configurations. The stepped load points may be uniformly or non-uniformly spaced across the length of the bayonet 114. In one embodiment, the incline portion 126 is defined by an angle Θ (hereinafter "angle 202"). The angle 202 may be in the range of between about 2 and 90 degrees. In a further embodiment, the angle 202 is in the range of between about 3 and 15 degrees. Alternatively, the angle 202 may be selected to produce a desired mechanical advantage or a perpendicular lid insertion force which translates to an axial force and displacement of the gasket flange 124. Additional factors in determining the appropriate lid insertion force include, but are not limited to the amount of axial displacement required, the length of the incline portion 126, the length of the land portion 128, and the transition radius (or in other terms the rise of the incline portion 126).

Figure 3A:
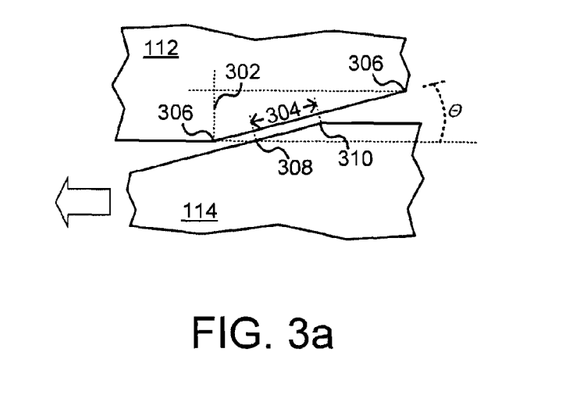
FIG. 3a is schematic block diagram illustrating an alternative embodiment of the channel and the bayonet in accordance with the present invention.

FIG. 3a is schematic block diagram illustrating an alternative embodiment of the channel 112 and the bayonet 114 in accordance with the present invention. The depicted embodiment illustrates a close up view of the mating surfaces of the channel 112 and the bayonet 114, and in particular a close up view just prior to engagement. As described above, some variables that affect the lid insertion force include the transition radius 302, the effective incline length 304, and the angle 202 of the incline.

The transition radius 302, in one embodiment, is the rise of the incline portion 126. In other words, the transition radius 302 is the distance from a transition point 306 (land portion 128 to incline portion 126) to a point directly above and parallel a subsequent transition point 306 (incline portion 128 to land portion 126). The transition radius 302, in effect, is a result of a combination of angle 202 and incline portion 126 length. In one embodiment, the transition radius 302 is in the range of between about 2 cm and 15 cm.

FIG. 3a also depicts the effective length 304. In one embodiment, the effective length comprises the length of the incline portion 126 that contacts the mating surface of the channel during bayonet engagement. One benefit of the present invention, as described previously, is that the required force for engagement is low because of the relatively short engagement length the bayonet must be pushed through. The effective length 304, therefore, is the distance from the point of engagement 308 to the incline portion 126 to land portion 128 transition 310. In one embodiment, the effective length 304 is in the range of between about 1 and 25 cm. Alternatively, the effective length 304 may be chosen to provide a desired mechanical advantage.

Figure 3B:
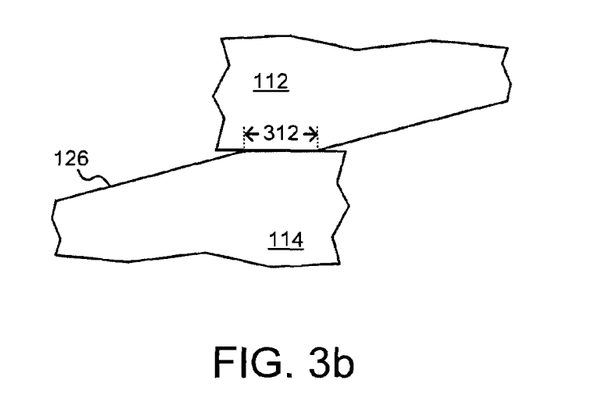
FIG. 3b is a schematic block diagram illustrating another embodiment of the channel and the bayonet in accordance with the present invention.

FIG. 3b is a schematic block diagram illustrating another embodiment of the channel 112 and the bayonet 114 in accordance with the present invention. The depicted embodiment illustrates the channel 112 and the bayonet 114 in a post-engagement configuration. In one embodiment, the land portion 128 may be defined as the portion of the bayonet 114 that contacts the channel 112 when the bayonet 114 is in a fully engaged or inserted position. Alternatively, the land portion 128 may refer to the entire horizontal portion of the bayonet 114. As with the effective length 304, the transition radius 302, and the angle 202, the length of the land portion 312 may be chosen to produce a desired mechanical advantage, or a desired lid insertion force. In one embodiment, the length 312 of the land portion may be in the range of between about 1 and 25 cm.

Figure 3C:
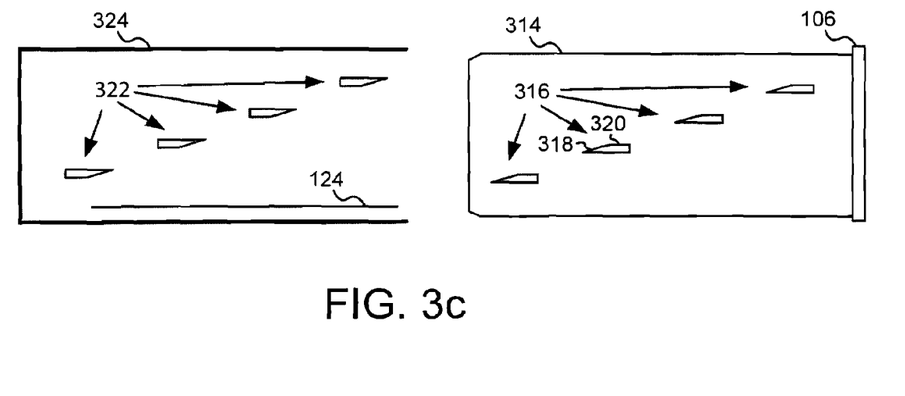
FIG. 3c is a schematic block diagram illustrating one embodiment of an alternative bayonet in accordance with the present invention.

FIG. 3c is a schematic block diagram illustrating one embodiment of an alternative bayonet 314 in accordance with the present invention. The depicted embodiment illustrates a side view of an alternative bayonet 314 having a plurality of wedges 316 extending outward from the bayonet 314. The wedges 316 may comprise both an incline portion 318 and a land portion 320. Similar mating wedges 322 may be integrally formed in the wall of the housing 324.

In one embodiment, the size and positioning of the wedges 316, 322 are selected to produce a sealing force on the gasket flange 124 (illustrated here as a line for clarity only). The force determining factors described above (transition radius, effective length, angle, etc.) likewise determine the gasket sealing or axial force with regard to the depicted embodiment of FIG. 3c.

Figure 4A:
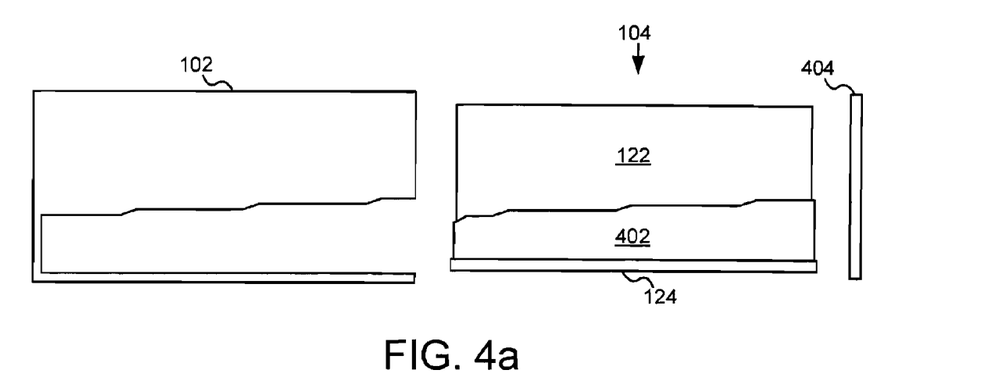
FIG. 4a is a schematic block diagram illustrating another embodiment of an alternative bayonet in accordance with the present invention.

FIG. 4a is a schematic block diagram illustrating another embodiment of an alternative bayonet 402 in accordance with the present invention. In one embodiment, the bayonet 402 is integrally formed in the side of the filter element assembly 104. Additionally, the filter element assembly 104 may comprise a plurality of bayonets 402 integrally formed in the housing engaging sides of the filter element assembly 104. A lid 404 may be either separate or alternatively coupled with the filter element assembly 104.

Figure 4B:
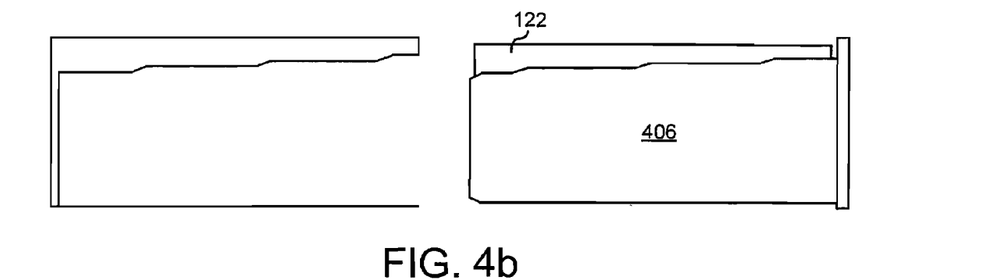
FIG. 4b is a schematic block diagram illustrating one embodiment of another alternative bayonet in accordance with the present invention.

FIG. 4b is a schematic block diagram illustrating one embodiment of another alternative bayonet 406 in accordance with the present invention. The bayonet 406, in one embodiment, may be configured with a configuration as depicted substantially enclosing the filtration media 122. The bayonets 406 may comprise uniformly distributed stepped load points. Alternatively, the bayonet 406 may be configured with any number of stepped load points, uniformly or non-uniformly distributed across the length of the bayonet 406.

Figure 4C:
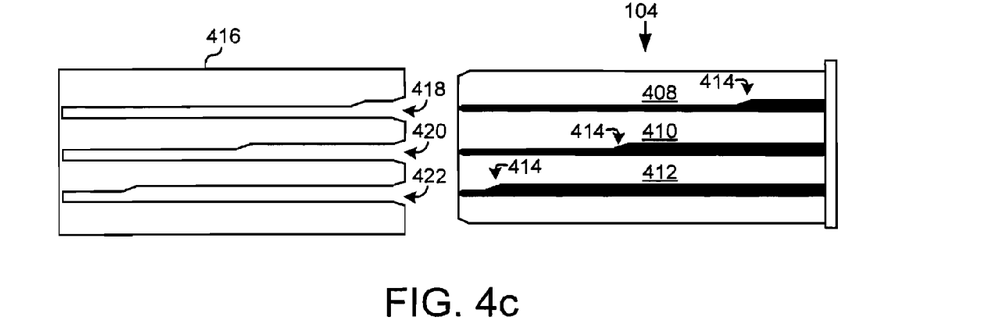
FIG. 4c is a schematic block diagram illustrating one embodiment of yet another alternative bayonet in accordance with the present invention.

FIG. 4c is a schematic block diagram illustrating one embodiment of yet another alternative bayonet 406 in accordance with the present invention. In the depicted embodiment, the filter element assembly comprises multiple bayonets 408, 410, 412 each bayonet having a unique stepped load point pattern. In one embodiment, each bayonet 408, 410, 412 may comprise one stepped load point 414 located in positions distributed across the length of the filter element assembly 104.

In an alternative embodiment, the filter element assembly 104 may comprise a plurality of identical bayonets (not shown). As depicted, the filter element assembly 104 comprises three bayonets 408, 410, 412, however any number of bayonets may be implemented in order to achieve a desired gasket sealing force. The housing 416 may likewise be implemented with a corresponding number of channels 418, 420, 422, each channel configured to engage a corresponding bayonet.

Figure 5A:
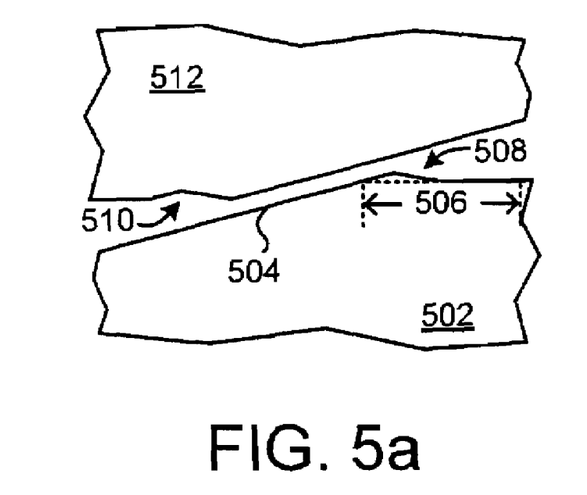
FIG. 5a is a schematic block diagram illustrating one embodiment of a bayonet having a reverse incline portion in accordance with the present invention.

FIG. 5a is a schematic block diagram illustrating one embodiment of a bayonet 502 having a reverse incline portion in accordance with the present invention. In one embodiment, the bayonet 502 comprises an incline portion 504, and a land portion 506. The land portion 506 may include a reverse incline portion 508 configured to engage a similar cutout portion 510 of the channel 512.

In one embodiment, the reverse incline portion 508 is configured to retain the filter element assembly and prevent "walk out" due to vibration. One or more stepped load points may be configured with a reverse incline portion 508.

Figure 5B:
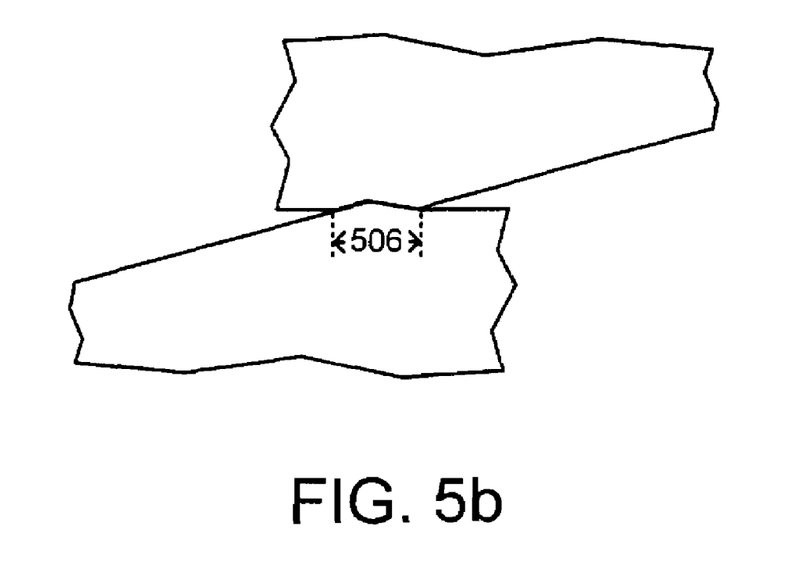
FIG. 5b is a schematic block diagram illustrating an alternative embodiment of the bayonet having a reverse incline portion in accordance with the present invention.

FIG. 5b is a schematic block diagram illustrating an alternative embodiment of the bayonet 502 having a reverse incline portion 508 in accordance with the present invention. In the depicted embodiment, the land portion 506 may be defined as the length of one section of the bayonet 502 that contacts the channel 512. In a further embodiment, the reverse incline portion 508 is configured to provide enough retaining force to prevent "walk out" but not so much as to cause difficulty in the removal of the filter element assembly.

Figure 6A:
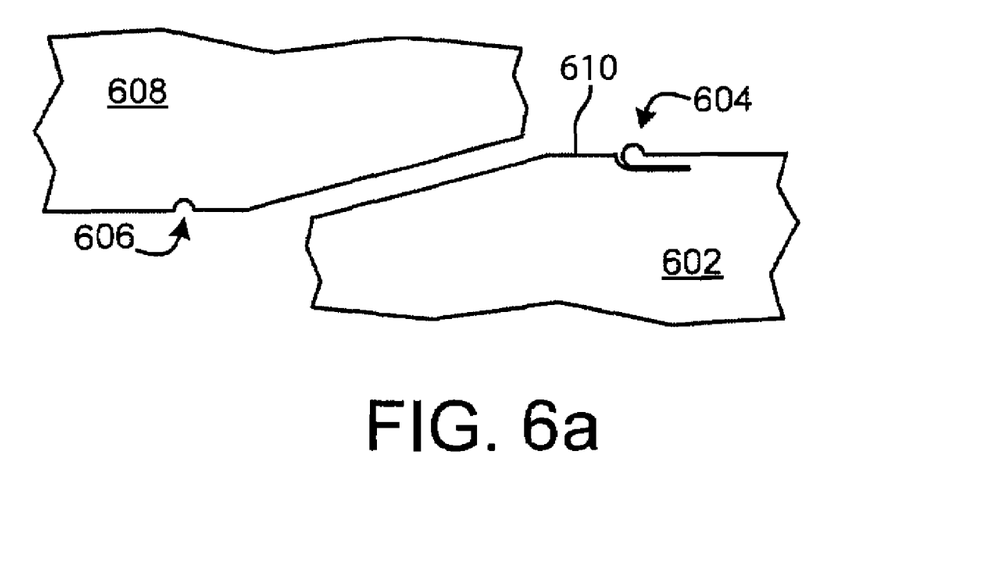
FIG. 6a is a schematic block diagram illustrating one embodiment of a bayonet having a spring detent in accordance with the present invention.

FIG. 6a is a schematic block diagram illustrating one embodiment of a bayonet 602 having a spring detent in accordance with the present invention. In one embodiment, the bayonet 602 comprises one or more spring loaded detents 604 configured to catch a corresponding cutout portion 606 in the channel 608. The bayonet 602 and the bayonet 502 of FIG. 5a both excel in applications that can tolerate some springback of the gasket flange 124.

Figure 6B:
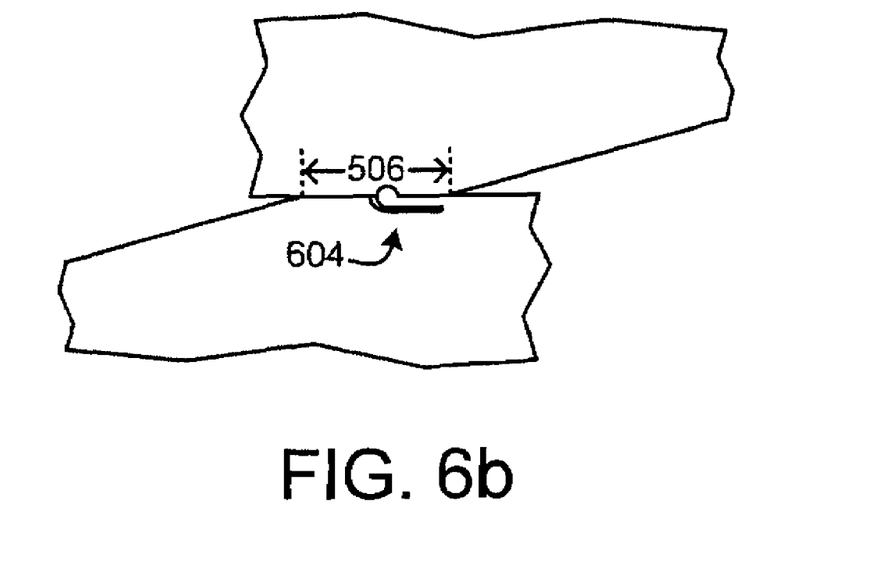
FIG. 6b is a schematic block diagram illustrating an alternative embodiment of the bayonet having a spring detent in accordance with the present invention.

FIG. 6b is a schematic block diagram illustrating an alternative embodiment of the bayonet having a spring detent in accordance with the present invention. In a fully engaged position, the spring detent 604 engages the cutout portion 606 and provides enough retaining force to prevent "walk out." The land portion 610 may be defined in a manner similar to the manner described above, that is, the length of one portion of the bayonet 602 that contacts the channel 608.

Figure 7A:
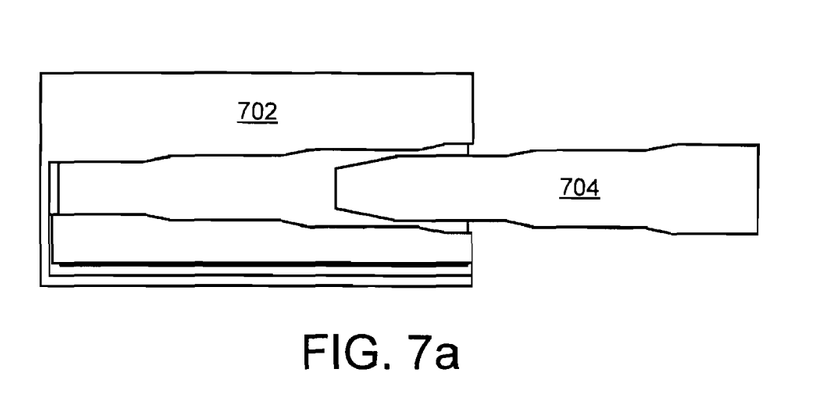
FIG. 7a is a schematic block diagram illustrating one embodiment of a symmetric bayonet in accordance with the present invention.

FIG. 7a is a schematic block diagram illustrating one embodiment of a symmetric bayonet 704 in accordance with the present invention. In one embodiment, the land and incline portions of the bayonet 704 may be mirrored in the bottom of the bayonet to form a bayonet 704 symmetric along a long axis. Alternatively, the land and incline portions may be offset. In a similar manner, the housing 702 may be formed with corresponding incline and land portions as depicted in FIG. 7a.

Figure 7B:
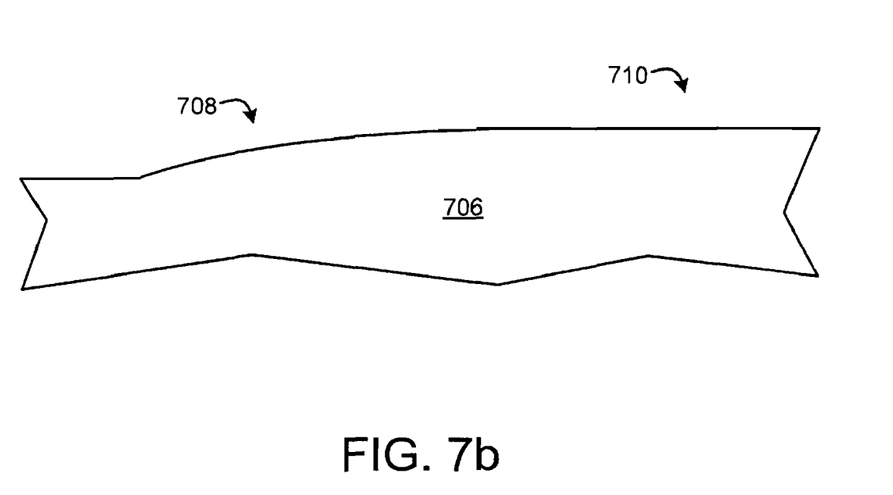
FIG. 7b is a schematic block diagram illustrating one embodiment of a bayonet having curved land portions in accordance with the present invention.

FIG. 7b is a schematic block diagram illustrating one embodiment of a bayonet having curved land portions in accordance with the present invention. In one embodiment, the bayonet 706 comprises a plurality of incline portions 708 and land portions 710. The bayonet 706 may be symmetric, or alternatively the bayonet 706 may be formed in a manner similar to the bayonet 114 of FIG. 1 having a substantially planar bottom surface for engaging the gasket flange 124.

The incline portions 708 may be arced as depicted, or alternatively linear as described above. The land portions 710, in one embodiment, are formed as "bumps" and corresponding cutout portions may be formed in the channel (not shown). As such the bayonet 706 functions in a manner similar to the bayonet 602 of FIGS. 6a and 6b. The land portions 710 may function like the spring detent 604 of FIG. 6a. The bayonet 706 may include as many land portions 710 as deemed necessary. The land portions 710 may be uniformly distributed across the length of the bayonet 706 or alternatively non-uniformly distributed. Many other configurations comprising an incline-like portion and a land-like portion may be implemented in order to reduce the insertion force required to secure a filter element assembly.

Figure 8:
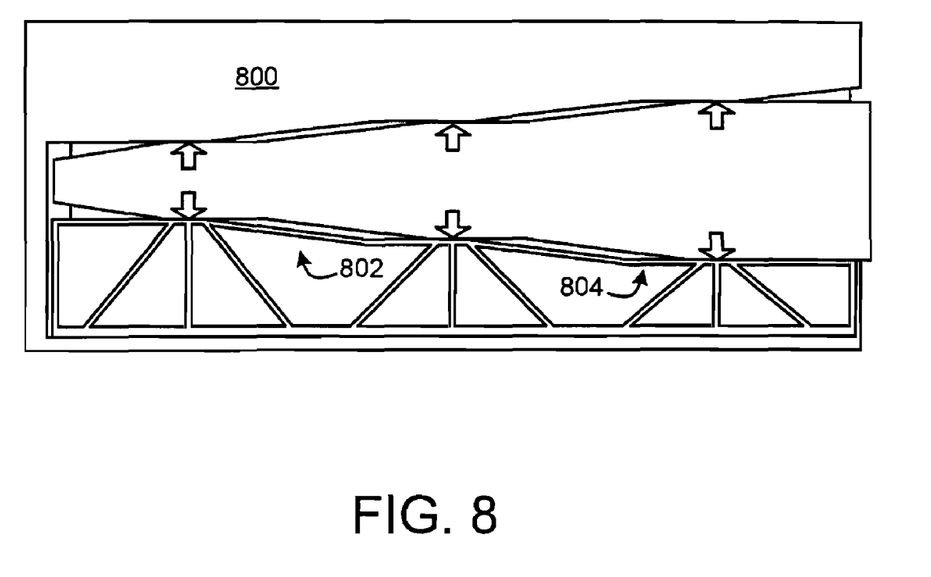
FIG. 8 is a side view diagram illustrating a cross-sectional view of alternative housing in accordance with the present invention.

FIG. 8 is a side view diagram illustrating a cross-sectional view of alternative housing 800 in accordance with the present invention. In one embodiment, incline portions 802 and land portions 804 may be bridged or gusseted to the gasket flange to increase the bending resistance of the gasket flange and further enhance uniform gasket loading.

The present invention may be embodied in other specific forms without departing from its spirit or essential characteristics; for example, different treatment components may be substituted for those shown in the drawings. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An air filter comprising:
   a housing comprising a channel having a plurality of incline portions and a plurality of land portions;
   the housing further comprising an opening configured to receive a filter element assembly having a gasket flange;
   a lid configured to cover the opening and coupled with at least one bayonet extending outward from the lid;
   wherein:
   the bayonet comprises a plurality of incline portions and a plurality of land portions, the incline and land portions of the bayonet configured to interface with the incline and land portions of the channel and provide a uniform axial sealing force on the gasket flange;
   said bayonet is inserted into said channel along an insertion direction and engages said channel along a series of discrete spaced contact points;
   said contact points lie along and are spaced along a projection line extending at an oblique angle relative to said insertion direction.

2. The air filter of claim 1, wherein:
   said contact points are spaced from each other along said projection line by respective discrete spaced non-engagement regions therebetween;
   said bayonet and said channel are axially spaced from each other at said non-engagement regions by respective discrete spaced axial gaps.

3. The air filter of claim 2, wherein:
   said contact points are axially spaced from said gasket flange by respective progressively increasing axial spans;
   said non-engagement regions are axially spaced from said gasket flange by respective progressively increasing axial spans.

4. The air filter of claim 1, wherein the incline portions have an incline angle in the range of between about 2 and 15 degrees.

5. The air filter of claim 1, wherein the incline portions have an incline angle in the range of between about 5 and 12 degrees.

6. The air filter of claim 1, wherein the incline portions have an incline angle of about 10 degrees.

7. The air filter of claim 1, wherein the housing further comprises an air intake port.

8. The air filter of claim 1, wherein the housing further comprises an air outlet port.

9. The air filter of claim 1, wherein the bayonet further comprises a spring detent configured to lock with the channel and prevent walk out of the filter element assembly.

10. The air filter of claim 1, wherein the bayonet further comprises a reverse incline portion configured to prevent walk out of the filter element assembly.

11. The air filter of claim 1, wherein the gasket flange is configured to direct all air intake through the filter element assembly.

12. An air filter system comprising:
a housing comprising a channel having a plurality of incline portions and a plurality of land portions;
the housing further comprising an opening configured to receive a filter element assembly having a gasket flange;
a lid configured to cover the opening and coupled with at least one bayonet extending outward from the lid;
wherein:
the bayonet comprises a plurality of incline portions and a plurality of land portions, the incline and land portions of the bayonet configured to interface with the incline and land portions of the channel and provide a uniform axial sealing force on the gasket flange;
the housing further comprises an air intake port and an air outlet port;
the incline portions have an incline angle of about 10 degrees;
said bayonet is inserted into said channel along an insertion direction and engages said channel along a series of discrete spaced contact points;
said contact points lie along and are spaced along a projection line extending at an oblique angle relative to said insertion direction.

13. The air filter of claim 12, wherein:
said contact points are spaced from each other along said projection line by respective discrete spaced non-engagement regions therebetween;
said bayonet and said channel are axially spaced from each other at said non-engagement regions by respective discrete spaced axial gaps.

14. The air filter of claim 13, wherein:
said contact points are axially spaced from said gasket flange by respective progressively increasing axial spans;
said non-engagement regions are axially spaced from said gasket flange by respective progressively increasing axial spans.

15. The air filter of claim 12, wherein the bayonet further comprises a spring detent configured to lock with the channel and prevent walk out of the filter element assembly.

16. The air filter of claim 12, wherein the bayonet further comprises a reverse incline portion configured to prevent walk out of the filter element assembly.

17. The air filter of claim 12, wherein the gasket flange is configured to direct all air intake through the filter element assembly.

18. An air filter comprising:
a housing comprising a channel having a plurality of incline portions and a plurality of land portions;
the housing further comprising an opening configured to receive a filter element assembly having a gasket flange;
a lid configured to cover the opening and coupled with at least one bayonet extending outward from the lid;
wherein:
the bayonet comprises a plurality of incline portions and a plurality of land portions, the incline and land portions of the bayonet configured to interface with the incline and land portions of the channel and provide an uniform axial sealing force on the gasket flange;
the bayonet further comprises a spring detent configured to lock with the channel and prevent walk out of the filter element assembly;
said bayonet is inserted into said channel along an insertion direction and engages said channel along a series of discrete spaced contact points;
said contact points lie along and are spaced along a projection line extending at an oblique angle relative to said insertion direction.

19. The air filter of claim 18, wherein:
said contact points are spaced from each other along said projection line by respective discrete spaced non-engagement regions therebetween;
said bayonet and said channel are axially spaced from each other at said non-engagement regions by respective discrete spaced axial gaps.

20. The air filter of claim 19, wherein:
said contact points are axially spaced from said gasket flange by respective progressively increasing axial spans;
said non-engagement regions are axially spaced from said gasket flange by respective progressively increasing axial spans.

21. The air filter of claim 19, wherein the incline portions have an incline angle in the range of between about 2 and 15 degrees.

22. An air filter comprising:
a housing comprising a channel having a plurality of incline portions and a plurality of land portions;
the housing further comprising an opening configured to receive a filter element assembly having a gasket flange;
a lid configured to cover the opening and coupled with at least one bayonet extending outward from the lid;
wherein:
the bayonet comprises a plurality of incline portions and a plurality of land portions, the incline and land portions of the bayonet configured to interface with the incline and land portions of the channel and provide an uniform axial sealing force on the gasket flange;
the bayonet further comprises a reverse incline portion configured to prevent walk out of the filter element assembly;
said bayonet is inserted into said channel along an insertion direction and engages said channel along a series of discrete spaced contact points;
said contact points lie along and are spaced alone a projection line extending at an oblique angle relative to said insertion direction.

23. The air filter of claim 22, wherein:
said contact points are spaced from each other along said projection line by respective discrete spaced non-engagement regions therebetween;

said bayonet and said channel are axially spaced from each other at said non-engagement regions by respective discrete spaced axial gaps.

24. The air filter of claim 23, wherein:

said contact points are axially spaced from said gasket flange by respective progressively increasing axial spans;

said non-engagement regions are axially spaced from said gasket flange by respective progressively increasing axial spans.

25. The air filter of claim 22, wherein the incline portions have an incline angle in the range of between about 2 and 15 degrees.

\* \* \* \* \*